United States Patent
Kimura et al.

(10) Patent No.: US 8,636,415 B2
(45) Date of Patent: Jan. 28, 2014

(54) SLIDING BEARING STRUCTURE FOR A SHAFT MEMBER

(75) Inventors: Yuichiro Kimura, Susono (JP); Shinichi Kato, Okazaki (JP); Yasuhiro Hikita, Nisshin (JP)

(73) Assignees: Toyota Jidosha Kabushiki Kaisha, Aichi-ken (JP); Taiho Kogyo., Ltd., Aichi-ken (JP)

( * ) Notice: Subject to any disclaimer, the term of this patent is extended or adjusted under 35 U.S.C. 154(b) by 0 days.

(21) Appl. No.: 13/444,260

(22) Filed: Apr. 11, 2012

(65) Prior Publication Data

US 2012/0263403 A1    Oct. 18, 2012

(30) Foreign Application Priority Data

Apr. 14, 2011 (JP) ................................ 2011-090111

(51) Int. Cl.
  *F16C 33/02*     (2006.01)
  *F16C 33/74*     (2006.01)

(52) U.S. Cl.
  USPC ............ 384/130; 384/140; 384/143; 384/278

(58) Field of Classification Search
  USPC ......... 384/130, 140, 143, 151–153, 276, 278, 384/294, 299, 300; 277/500, 503, 505
  See application file for complete search history.

(56) References Cited

U.S. PATENT DOCUMENTS

| | | | | |
|---|---|---|---|---|
| 2,985,494 A | * | 5/1961 | Terhorst ........................ | 384/278 |
| 3,008,779 A | * | 11/1961 | Spriggs .......................... | 384/299 |
| 3,386,783 A | * | 6/1968 | Scheufler ....................... | 384/291 |
| 3,449,032 A | * | 6/1969 | Scheufler ....................... | 384/278 |
| T893,014 I4 | * | 12/1971 | Gatzemeyer et al. ......... | 384/276 |
| 4,913,562 A | * | 4/1990 | Rosen ............................ | 384/276 |
| 5,645,356 A | * | 7/1997 | Shibayama et al. .......... | 384/138 |
| 5,727,885 A | * | 3/1998 | Ono et al. ...................... | 384/294 |
| 6,702,469 B1 | * | 3/2004 | Taniguchi et al. ............ | 384/418 |
| 2004/0011327 A1 | * | 1/2004 | Oyamada et al. ............. | 123/337 |
| 2005/0276529 A1 | * | 12/2005 | Caspers et al. ................ | 384/294 |
| 2009/0152966 A1 | | 6/2009 | Bock et al. | |

FOREIGN PATENT DOCUMENTS

| | | | |
|---|---|---|---|
| DE | 102004024983 A1 | * | 12/2005 |
| DE | 10 2004 028 773 A1 | | 1/2006 |
| JP | 07-004424 A | | 1/1995 |
| JP | 2007-285456 A | | 11/2007 |
| JP | 2009-092246 A | | 4/2009 |

OTHER PUBLICATIONS

DE 102004024983 A1—Machine Translation.*

* cited by examiner

*Primary Examiner* — Phillip A Johnson
(74) *Attorney, Agent, or Firm* — Sughrue Mion, PLLC (57) ABSTRACT

A sliding bearing structure for a shaft member includes: a shaft member; a bearing member rotates relative to the shaft member; an oil supply space to which lubrication is supplied between sliding surfaces of the shaft member and the bearing member; two annular grooves formed in a circumferential direction in an inner peripheral surface of the bearing member; and two annular seal members formed as separate pieces from the shaft member and the bearing member, and arranged in the annular grooves between the shaft member and the bearing member. Each annular seal member is formed in plural, and is made of material having a thermal expansion coefficient such that an inside diameter of the annular seal member is smaller than an inside diameter of the bearing member at a low temperature, and is the same as or larger than the inside diameter of the bearing member at a high temperature.

11 Claims, 6 Drawing Sheets

SLIDING BEARING STRUCTURE FOR A SHAFT MEMBER

INCORPORATION BY REFERENCE

The disclosure of Japanese Patent Application No. 2011-090111 filed on Apr. 14, 2011 including the specification, drawings and abstract is incorporated herein by reference in its entirety.

BACKGROUND OF THE INVENTION

1. Field of the Invention

The invention relates to sliding bearing structure for a shaft member, and more particularly, to a sliding bearing structure for a shaft member, that is used in a vehicular internal combustion engine or the like.

2. Description of Related Art

With a typical sliding bearing structure for a shaft member, lubricating oil is supplied to form a lubricant film in a clearance between a sliding surface of a shaft member and a sliding surface of a bearing member. Supporting a load by the oil film pressure that is created in this lubricant film reduces friction loss and helps to prevent wear and seizure.

In order to keep lubricating oil in the clearance between such sliding surfaces, a bearing structure in which many narrow grooves or striations are formed in parallel in the circumferential direction in the inner peripheral surface of the bearing has been proposed.

Also, Japanese Patent Application Publication No. 2007-285456 (JP 2007-285456 A) describes a bearing structure that obtains a lubrication characteristic, reduces surface pressure, and improves seizure resistance, by forming a concave portion in a bearing member that contacts a rotating shaft and putting a contraction member that is made of material with a larger coefficient of thermal expansion than the bearing member in the concave portion, such that the concave portion becomes an oil reservoir when the bearing portion is cold, and forms a flush sliding surface by the expansion of the contraction member when the bearing portion heats up.

In a vehicular internal combustion engine or the like, after the engine has warmed up, there is not that much sliding resistance (i.e., friction loss) at a sliding bearing, but during a cold start from an extremely low temperature (approximately −30° C.) to room temperature (approximately 20° C. to 25° C.), for example, there is an extremely large amount of sliding resistance. This is because the viscosity of the lubricating oil depends on the temperature, and when the temperature is low, the viscosity drastically increases.

Therefore, in order to reduce the sliding resistance at such low temperatures, it is preferable to raise the temperature of the bearing portion early on. However, when the temperature is low, the temperature of the supplied lubricating oil itself is also low, so an increase in temperature is delayed, and even if the temperature of the lubricating oil is increased by heat generated from shearing resistance, this lubricating oil ends up quickly flowing out of the bearing portion, so it takes time to raise the temperature of the bearing portion.

On the other hand, at a high temperature (approximately 80° C. to 120° C.) during high speed operation or steady operation after the engine has warmed up, the temperature may rise excessively, resulting in seizure or the like, unless there is a sufficient amount of lubricating oil, so a sliding bearing structure that displays sufficient cooling performance at high temperatures is needed.

The bearing structure described in JP 2007-285456 A has a contraction member that is made of material with a larger coefficient of thermal expansion than the bearing member set in a concave portion that is formed in a bearing member that contacts a rotating shaft, and the concave portion becomes an oil reservoir when the bearing portion is cold. The bearing structure is not intended to raise the temperature of the bearing portion early on.

SUMMARY OF THE INVENTION

The invention thus provides a sliding bearing structure for a shaft member that is capable of reducing sliding resistance at low temperatures early on and will not impede cooling performance by lubricating oil at high temperatures.

A first aspect of the invention relates to a sliding bearing structure for a shaft member that includes a shaft member, a bearing member that rotates relative to the shaft member, and an oil supply space to which lubricating oil is supplied between a sliding surface of the shaft member and a sliding surface of the bearing member. The sliding bearing structure for a shaft member also includes two annular grooves formed in a circumferential direction in an inner peripheral surface of the bearing member, and two annular seal members that are formed as separate pieces from the shaft member and the bearing member, and that are arranged one in each of the annular grooves, between the shaft member and the bearing member. Each annular seal member is formed by a plurality of parts, and is made of material having a coefficient of thermal expansion such that an inside diameter of at least a portion of the annular seal member is smaller than an inside diameter of the bearing member at a low temperature, and is the same as or larger than the inside diameter of the bearing member at a high temperature.

In this specification, the term "low temperature" refers to a state in which the temperature of the bearing portion is low, from the extremely low temperature described above (approximately −30° C. to 0° C.) to room temperature (approximately 20° C. to 25° C.), and the term "high temperature" refers to a state in which the temperature of the bearing portion is high (approximately 80° C. to 120° C.) during high speed operation or steady operation after an engine has warmed up.

According to this aspect, each annular seal member is formed by a plurality of parts, so it is easy to assemble to the shaft member or the bearing member. Also, the annular seal members deform such that at least a portion of the inside diameter of the seal members become smaller than the inside diameter of the bearing member at a low temperature, and become the same as or larger than the inside diameter of the bearing member at a high temperature. Therefore, at a low temperature, the distance between the annular seal members and the shaft member becomes less than the distance between the shaft member and the bearing member, such that the amount of lubricating oil supplied between the sliding surfaces of the shaft member and the bearing member that leaks out from both ends of the bearing member is limited. As a result, the lubricating oil retained in the bearing portion is sheared and thus heats up, causing the temperature of the bearing portion to rise early on. On the other hand, at a high temperature, the distance between the seal members and the shaft member becomes the same as or greater than the distance between the shaft member and the bearing member, so the amount of lubricating oil that leaks out from both ends of the bearing portion is not limited. As a result, good cooling action of the bearing portion by the lubricating oil is able to be displayed.

According to the aspects described above, a sliding bearing structure for a shaft member that is capable of reducing sliding resistance at low temperatures early on and will not impede cooling performance by lubricating oil at high temperatures is able to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings.

Figure 1:
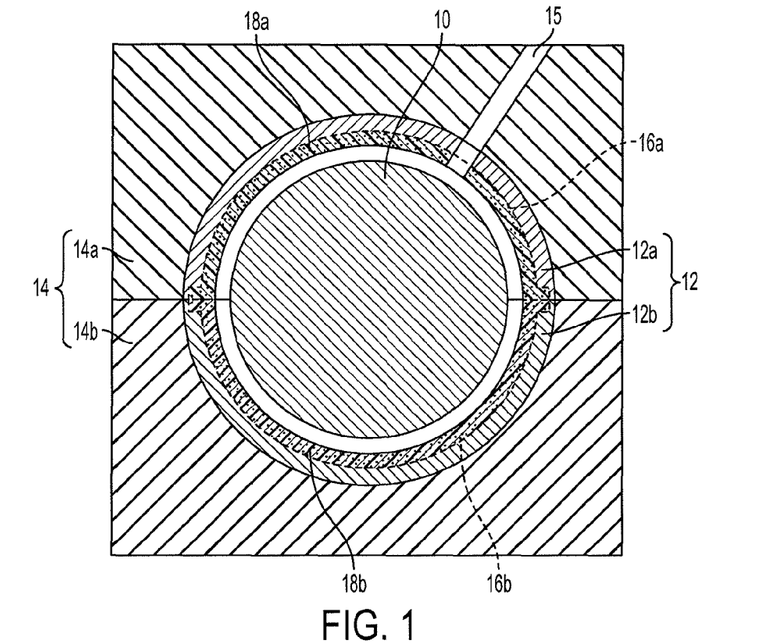
FIG. 1 is a transverse sectional view of a sliding bearing structure for a shaft member according to one example embodiment of the invention.
Figure 2:
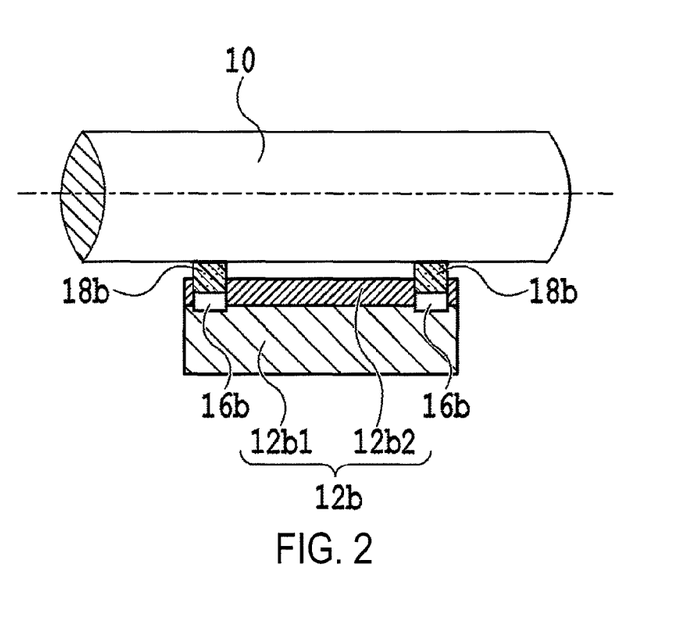
FIG. 2 is a longitudinal sectional view of the lower half of the sliding bearing structure for a shaft member in FIG. 1.

First, an example embodiment in which the invention has been applied to a sliding bearing structure of a crankshaft of an engine will be described with reference to FIGS. 1 and 2. FIGS. 1 and 2 show a main journal 10 of a crankshaft that serves as a shaft member that rotates, and a journal bearing 12 that serves as a bearing member for rotatably supporting the main journal 10. The journal bearing 12 is housed fixed, retained in a bearing housing 14 formed by an upper housing 14a that is formed in a cylinder block, not shown, and a lower housing 14b that is formed in a bearing cap that is fastened to the upper housing 14a.

The journal bearing 12 is formed by an upper journal bearing 12a and a lower journal bearing 12b. The upper journal bearing 12a is formed with an upper lining attached to an upper back plate, and the lower journal bearing 12b is formed with a lower lining 12b2 attached to a lower back plate 12b1. (Only the lower journal bearing 12b that is formed by the lower back plate 12b1 and the lower lining 12b2 is shown in FIG. 2.) Also, an oil supply space set by a predetermined clearance formed in the circumferential direction is provided between the main journal 10 and the journal bearing 12 that is formed by the upper journal bearing 12a and the lower journal bearing 12b. Lubricating oil is supplied to this oil supply space via an oil passage 15 and an oil hole formed in the upper journal bearing 12a.

In the journal bearing 12, an annular groove (that includes an upper annular groove and a lower annular groove 16b) formed in the circumferential direction is formed continuous at each axial end portion, in a sliding surface of the inner periphery of both the upper journal bearing 12a and the lower journal bearing 12b. (Only the lower journal bearing 12b and the inner peripheral surface 16b are shown in FIG. 2). An annular seal member 18 (that includes an upper seal member 18a and a lower seal member 18b) that is formed by two halved parts that are formed as separate pieces from the main journal 10 and the journal bearing 12 is arranged in each annular groove (that is made up of the upper groove and the lower annular groove 16b), between the main journal 10 and the journal bearing 12.

Figure 3A:
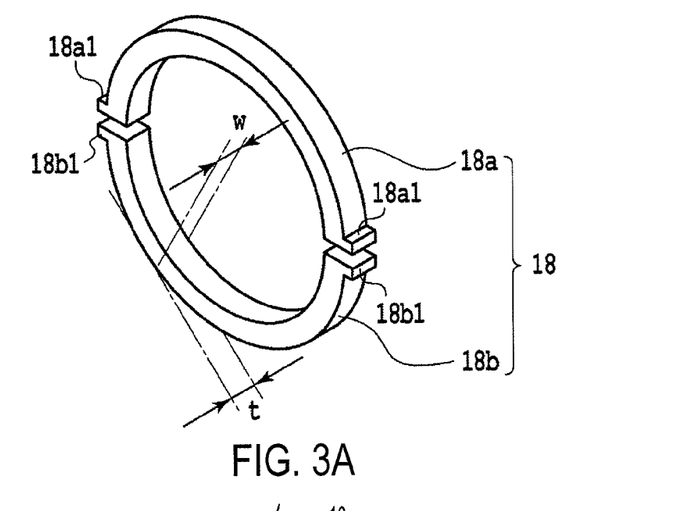
FIG. 3A is a perspective view of an example of a seal member used in the sliding bearing structure for a shaft member according to the example embodiment of the invention.
Figure 3B:
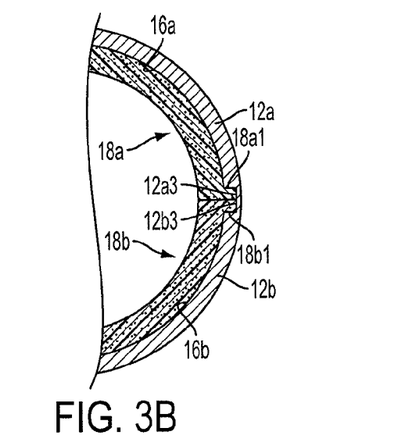
FIG. 3B is a partial enlarged sectional view of an example of the seal member used in the sliding bearing structure for a shaft member according to the example embodiment of the invention shown in FIG. 3A, when the seal member is assembled to the bearing member.
Figure 3C:
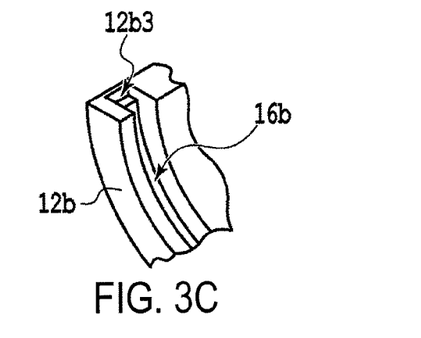
FIG. 3C is a partial perspective view of an end portion of a bearing member used in the sliding bearing structure for a shaft member according to the example embodiment of the invention.

As shown in FIG. 3A, the upper seal member 18a and the lower seal member 18b that are the two halves each have a generally rectangular cross section of a width w and a thickness t. Protruding portions 18a1 and 18b1 that extend radially outward are formed on the end portions in the circumferential direction of the upper seal member 18a and the lower seal member 18b, respectively. The protruding portions 18a1 and the 18b1 of the upper seal member 18a and the lower seal member 18b are vertically joined together to form the annular seal member 18. As shown in FIGS. 3B and 3C, notch portions 12a3 and 12b3 that house and fix the protruding portions 18a1 and 18b1, respectively, are formed in the upper journal bearing 12a and the lower journal bearing 12b, respectively, that serve as the bearing member. Only a portion of the lower journal bearing 12b is shown in FIG. 3C.

The circumferential end portions of the upper seal member 18a and the lower seal member 18b that are formed as the halves are formed in positions overlapping with the circumferential end portions of the upper journal bearing 12a and the lower journal bearing 12b. Therefore, according to this example embodiment, both the upper journal bearing 12a and the lower journal bearing 12b, and the upper seal member 18a and the lower seal member 18b are easy to position, which improves assemblability. Also, the seal member is able to be prevented from falling out of the annular groove when the seal member contracts at low temperatures.

Figure 4A:
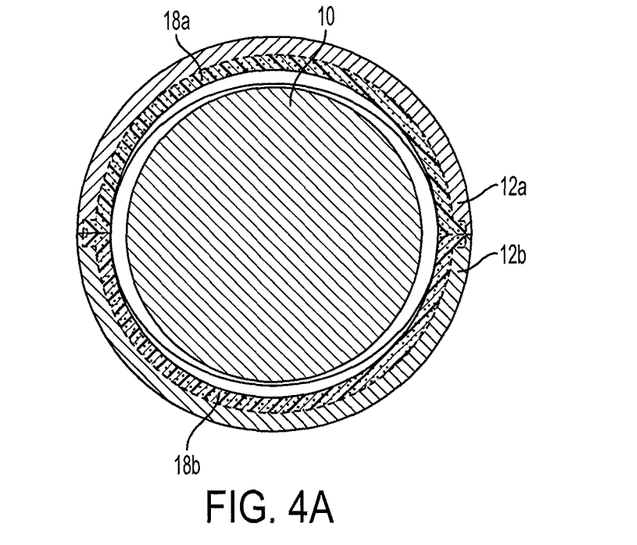
FIG. 4A is a transverse sectional view of an example of the seal member used in the sliding bearing structure for a shaft member according to the example embodiment of the invention, at an extremely low temperature.
Figure 4B:
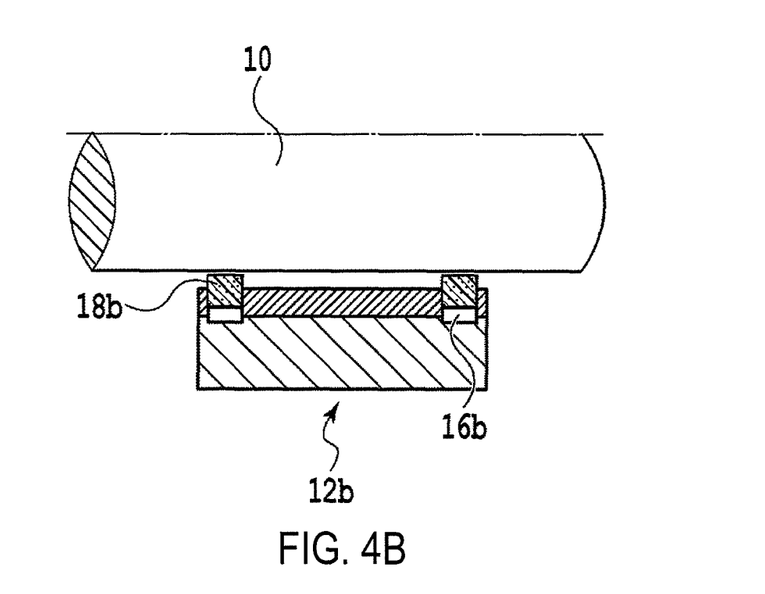
FIG. 4B is a longitudinal sectional view of the lower half of an example of the seal member used in the sliding bearing structure for a shaft member according to the example embodiment of the invention, at an extremely low temperature.
Figure 5A:
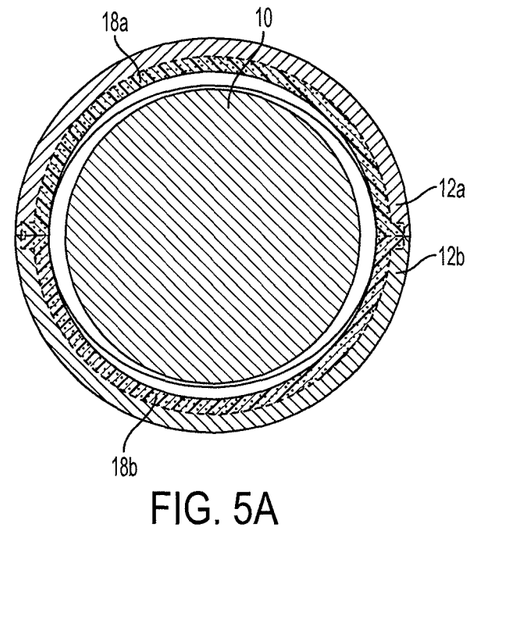
FIG. 5A is a transverse sectional view of an example of the seal member used in the sliding bearing structure for a shaft member according to the example embodiment of the invention, at a low temperature of approximately room temperature.
Figure 5B:
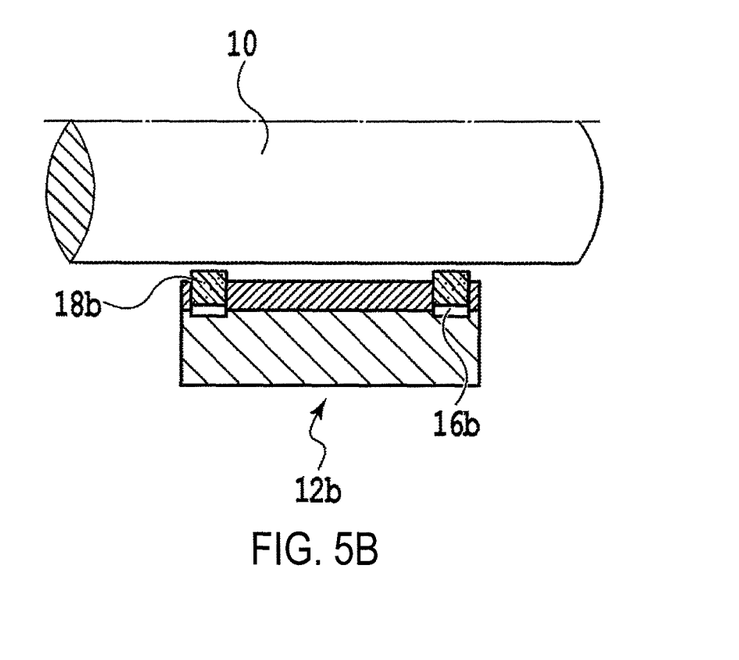
FIG. 5B is a longitudinal sectional view of the lower half of an example of the seal member used in the sliding bearing structure for a shaft member according to the example embodiment of the invention, at a low temperature of approximately room temperature.
Figure 6A:
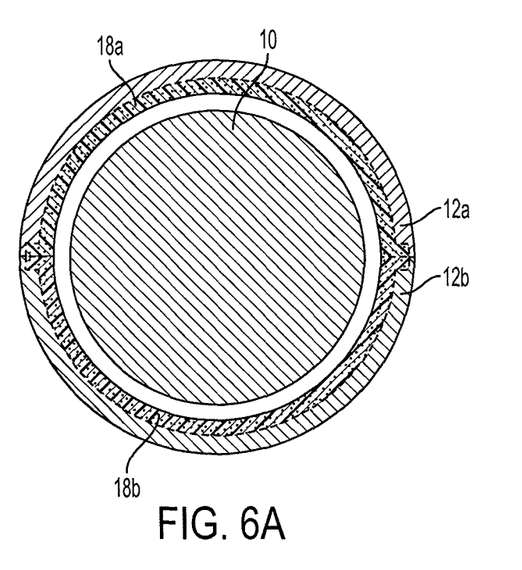
FIG. 6A is a transverse sectional view of an example of the seal member used in the sliding bearing structure for a shaft member according to the example embodiment of the invention, at a high temperature.
Figure 6B:
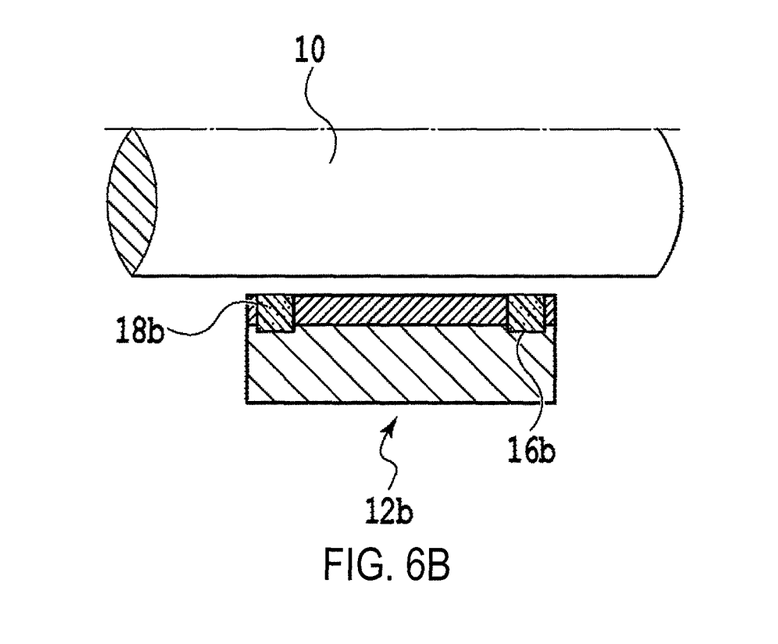
FIG. 6B is a longitudinal perspective view of the lower half of an example of the seal member used in the sliding bearing structure for a shaft member according to the example embodiment of the invention, at a high temperature.

The annular seal member 18 is positioned with an outside diameter portion thereof in the annular groove (that is made up of the upper annular groove and the lower annular groove 16b), and is formed of material (such as polyimide resin) that has a coefficient of thermal expansion that changes according to the temperature. More specifically, at extremely low temperatures of approximately −30° C. to 0° C., for example, the inside diameter of at least a portion of the annular seal member 18 is smaller than the inside diameter of the journal bearing 12, i.e., is substantially the same as the outside diameter of the main journal 10, as shown in FIGS. 4A and 4B. Also, at room temperature of approximately 20° C. to 25° C., the inside diameter of the annular seal member 18 is slightly smaller than the inside diameter of the journal bearing 12, as shown in FIGS. 5A and 5B. Furthermore, at high temperatures of approximately 80° C. to 120° C. when the temperature has increased such as during high speed operation or steady operation after the engine has warmed up, the inside diameter of the annular seal member 18 is the same as or larger than the inside diameter of the journal bearing 12, i.e., the amount of the thickness t of the annular seal member 18 is inside the annular groove (that is made up of the upper annular groove and the lower annular groove 16b), as shown in FIGS. 6A and 6B. When the journal bearing 12 is made of at least one of iron-based, aluminum based material, and copper based material, any material (for example, resin) with a coefficient of thermal expansion larger than that of the journal bearing 12 may be used for the annular seal member 18 used here.

The depth of the annular groove (that is made up of the upper annular groove and the lower annular groove 16b) is determined such that the inside diameter portion of the annular seal member 18 when the annular seal member 18 is expanded when the temperature is high is the same as or greater than the inside diameter of the journal bearing 12.

According to this example embodiment, at startup when the temperature is low in which case the engine is cold, the annular seal member 18 is in a contracted state such that the inside diameter of at least a portion of the annular seal member 18, i.e., the center portion of both the upper seal member 18a and the lower seal member 18b, contracts so that it is smaller than the inside diameter of the journal bearing 12 and the distance between the annular seal member 18 and the main journal 10 is less than the distance between the main journal 10 and the journal bearing 12, as shown in FIG. 4 (the protruding portions 18a1 and 18b1 of the upper seal member 18a and the lower seal member 18b, respectively, are unable to contract toward the radial center because they are fixed sandwiched between the upper journal bearing 12a and the lower journal bearing 12b). In this state, lubricating oil that has been supplied via the oil passage 15 to the oil supply space set between the sliding surfaces of the main journal 10 and the journal bearing 12 is blocked from flowing out by the seal member 18 that is in the contracted state, so the amount of lubricating oil that leaks out from the axial end portions of the journal bearing 12 is limited. Therefore, the lubricating oil that is retained in the journal bearing 12 between the annular seal members 18 is sheared with the rotation of the main journal 10, and thus creates heat, which causes the temperature of the journal bearing 12 to increase early on. The outside diameter of the annular seal members 18 at this low temperature is set to be larger than the inside diameter of the journal bearing 12.

On the other hand, at room temperature when warm-up of the engine has progressed, the inside diameter of the annular seal members 18 are in a rated state that is slightly smaller than the inside diameter of the journal bearing 12, as shown in FIGS. 5A and 5B. The characteristic of the sliding bearing can be set depending on how the difference between the inside diameter of the annular seal members 18 that are in this rated state and the inside of the journal bearing 12, i.e., the amount that the annular seal members 18 protrude to the inside of the journal bearing 12, is set. That is, if this protrusion amount is set large, the bearing portion warming effect at low temperatures will decrease, but the cooling action at high temperatures that will be described later will improve. Also, if the protrusion amount is set small, the opposite will happen. Therefore, this characteristic can be set for the usage environment (the destination) of the engine.

Furthermore, at a high temperature after warm-up, the annular seal members 18 are in a thermally expanded state and deform such that the inside diameter of the annular seal members 18 becomes the same as or larger than the inside diameter of the journal bearing 12. As a result, the distance between the annular seal members 18 and the main journal 10 becomes the same as or greater than the distance between the main journal 10 and the journal bearing 12, as shown in FIGS. 6A and 6B (more correctly, this is unable to be seen in FIG. 6A). In this state, the lubricating oil that has been supplied via the oil passage 15 is unable to be prevented from flowing out by the annular seal members 18 that are in the thermally expanded state, so the amount of lubricating oil that leaks out from the both axial end portions of the journal bearing 12 is not limited. As a result, good cooling action of the bearing portion by the lubricating oil is able to be displayed. That is, at the high temperature, the oil supply space set between the main journal 10 and the journal bearing 12 is communicated with an area to the outside, in the axial direction of the main journal 10, of the two annular seal members 18.

Next, a sliding bearing structure for a shaft member according to another example embodiment of the invention will be described with reference to FIGS. 7A to 7C. This other example embodiment differs from the example embodiment described above only with respect to the fixing structure of the annular seal member 18 and the journal bearing 12 that serves as the bearing structure. Therefore, portions having like functions will be denoted by the same reference characters used in the example embodiment described above, and redundant descriptions of those portions will be omitted.

Figure 7A:
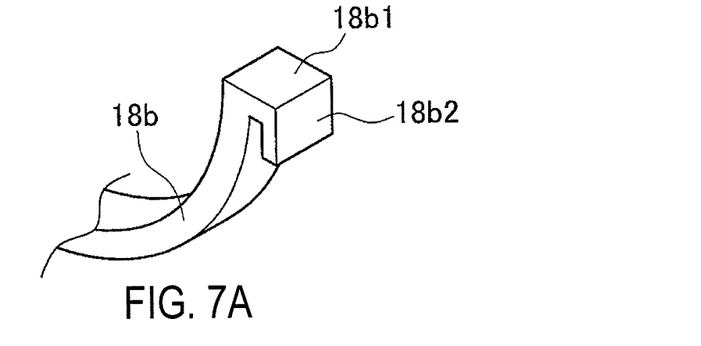
FIG. 7A is a perspective view of an example of an end portion of a seal member used in the sliding bearing structure for a shaft member according to another example embodiment of the invention.
Figure 7B:
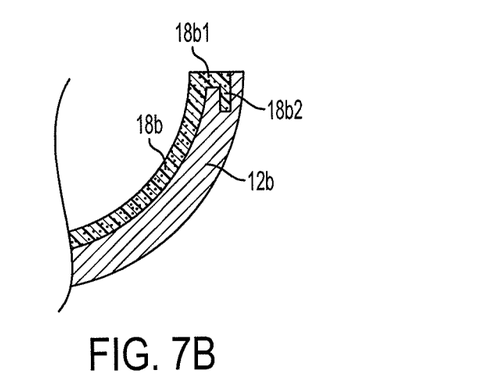
FIG. 7B is a partial enlarged sectional view of the example of end portion of the seal member used in the sliding bearing structure for a shaft member according to the other example embodiment of the invention shown in FIG. 7A, when the seal member is assembled to the bearing member.
Figure 7C:
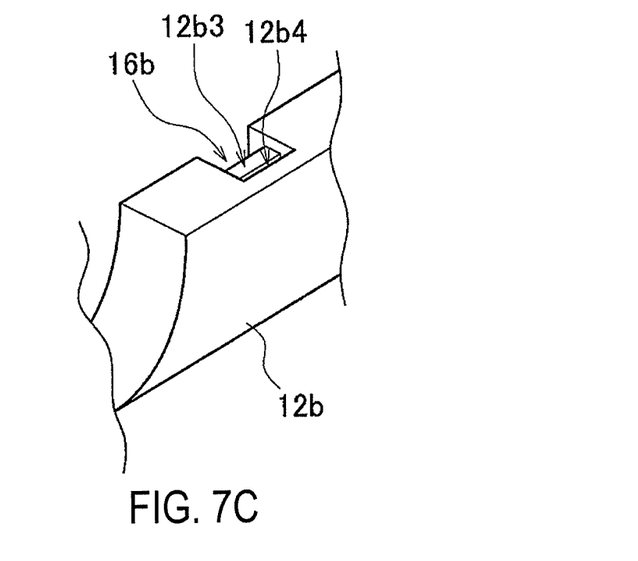
FIG. 7C is a partial sectional view of an end portion of the bearing member used in the sliding bearing structure for a shaft member according to the other example embodiment of the invention.

An extending portion 18b2 that extends in the circumferential direction from a radial outside end portion is formed on each protruding portion 18a1 and 18b1 of the upper seal member 18a and the lower seal member 18b (only the lower seal member 18b is shown in FIGS. 7A and 7B). As a result, a retaining portion is formed by the main body portion of the lower seal member 18b, the radially protruding portion 18b1, and the extending portion 18b2 that extends in the circumferential direction. A concave portion 12b4 is formed in each notch portion 12a3 and 12b3 that is formed in the circumferential end portion of the upper journal bearing 12a and the lower journal bearing 12b. These concave portions 12b4 house and fix the extending portions 18b2.

According to the other example embodiment, the circumferential end portion of both the upper seal member 18a and the lower seal member 18b is reliably inhibited from moving in the radial direction. Therefore, even clearance on both sides in the radial direction is able to be reliably ensured when the annular seal members 18 contract at a low temperature.

In the foregoing description, example embodiments in which the invention is applied to a bearing portion of a main journal of a crankshaft are described, but the invention may also be applied to a sliding bearing structure of another portion, such as a main journal bearing portion of a cam shaft or a pin portion of a crankshaft, for example. Also, similar effects can be obtained by forming the annular groove described above in a bearing housing that supports a shaft member and arranging the seal member described above, also with a direct bearing structure that has no journal bearing.

What is claimed is:

1. A sliding bearing structure for a shaft member, comprising:
    a shaft member;
    a bearing member that rotates relative to the shaft member;
    an oil supply space to which lubricating oil is supplied between a sliding surface of the shaft member and a sliding surface of the bearing member;
    two annular grooves formed in a circumferential direction in an inner peripheral surface of the bearing member; and
    two annular seal members that are formed as separate pieces from the shaft member and the bearing member, and that each annular seal member is arranged in each of the annular grooves, between the shaft member and the bearing member,
    wherein each annular seal member is formed by a plurality of parts, and is made of material having a coefficient of thermal expansion such that an inside diameter of at least a portion of the annular seal member is smaller than an inside diameter of the bearing member at a low temperature, and is the same as or larger than the inside diameter of the bearing member at a high temperature.

2. The sliding bearing structure for the shaft member according to claim 1, wherein the two annular grooves are formed near axial end portions of the shaft member, in the inner peripheral surface of the bearing member.

3. The sliding bearing structure for the shaft member according to claim 1, wherein each annular seal member is formed in two halves in a circumferential direction of the annular seal member.

4. The sliding bearing structure for the shaft member according to claim 3, wherein:
    the bearing member includes an upper bearing member and a lower bearing member; and
    circumferential end portions of each annular seal member formed in the two halves are formed in positions overlapping with circumferential end portions of the upper bearing member and the lower bearing member, respectively.

5. The sliding bearing structure for the shaft member according to claim 1, wherein:
    a protruding portion that extends radially outward is formed on each circumferential end portion of each annular seal member; and
    a notch portion that houses and fixes the protruding portion is formed in the bearing member.

6. The sliding bearing structure for the shaft member according to claim 5, wherein:
    an extending portion that extends in a circumferential direction from an outer end portion in the radial direction is formed on the protruding portion; and
    a concave portion that houses the extending portion is formed in the notch portion.

7. The sliding bearing structure for the shaft member according to claim 1, wherein:
    the low temperature is a state in which an engine to which the sliding bearing structure is applied needs to be warmed up; and
    the high temperature is a state in which an engine to which the sliding bearing structure is applied is finished warming up.

8. The sliding bearing structure for the shaft member according to claim 7, wherein:
    the low temperature is a temperature of an engine to which the sliding bearing structure is applied that is approximately −30° C. to 0° C.; and
    the high temperature is a temperature of an engine to which the sliding bearing structure is applied that is approximately 80° C. to 120° C.

9. The sliding bearing structure for the shaft member according to claim 1, wherein an outside diameter of each annular seal member at the low temperature is larger than the inside diameter of the bearing member.

10. The sliding bearing structure for the shaft member according to claim 1, wherein:
    the bearing member is made of at least one of iron-based material, aluminum based material, and copper based material; and
    the annular seal members are made of polyimide resin.

11. The sliding bearing structure for the shaft member according to claim 1, wherein, at the high temperature, a distance between the inside diameter of the annular seal members and the sliding surface of the shaft member is more than a distance between the inside diameter of the annular seal members and the sliding surface of the shaft member at the low temperature.

* * * * *